(12) United States Patent  (10) Patent No.: US 7,965,403 B2
Murakami  (45) Date of Patent: Jun. 21, 2011

(54) IMAGE FORMING APPARATUS, MANAGEMENT INFORMATION PROCESSING TERMINAL, AND STATUS INFORMATION MANAGEMENT SYSTEM

(75) Inventor: Masahiro Murakami, Hekinan (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 1491 days.

(21) Appl. No.: 11/385,913

(22) Filed: Mar. 22, 2006

(65) Prior Publication Data
US 2006/0218272 A1  Sep. 28, 2006

(30) Foreign Application Priority Data
Mar. 22, 2005 (JP) ................... 2005-081668

(51) Int. Cl.
*G06F 3/12* (2006.01)
*G06F 13/14* (2006.01)
*G06F 3/00* (2006.01)
*G06K 15/02* (2006.01)

(52) U.S. Cl. ......... 358/1.15; 358/1.11; 710/240; 710/19
(58) Field of Classification Search .................. 358/1.15, 358/1.1; 710/240, 244, 15, 18, 19
See application file for complete search history.

(56) References Cited

U.S. PATENT DOCUMENTS

| 2003/0059221 A1* | 3/2003 | Funahashi ..................... 399/8 |
| 2003/0210416 A1* | 11/2003 | Lewis et al. ................... 358/1.13 |
| 2004/0218204 A1 | 11/2004 | Nomura |

FOREIGN PATENT DOCUMENTS

| JP | H07-141133 A | 6/1995 |
| JP | 08310084 A | * 11/1996 |
| JP | 9 34668 | 2/1997 |
| JP | H11-232058 A | 8/1998 |
| JP | 11 296467 | 10/1999 |
| JP | 2000-043381 A | 2/2000 |
| JP | 2001-334731 A | 12/2001 |
| JP | 2002 196896 | 7/2002 |
| JP | 2004-130784 A | 4/2004 |
| JP | 2005-045448 A | 2/2005 |

OTHER PUBLICATIONS

Japan Patent Office, Notification of Reason for Refusal for counterpart Patent Application No. JP 2005-081668, mailed Jun. 23, 2009.

* cited by examiner

*Primary Examiner* — Thomas J Lett
(74) *Attorney, Agent, or Firm* — Baker Botts L.L.P.

(57) ABSTRACT

When an inquiry of a device state is received at a first communication port from an information processing terminals, a corresponding printer determines whether a second communication port that is communicably connected to the information processing terminal is present besides the first communication port, and if the second communication port is present, determines whether the first communication port is a communication port of the highest priority among the communication ports currently connected to the communicable terminals, and if the second communication port is not present or the first communication port is the communication port of the highest priority, makes the status information expressing the operation state of the device be sent from the first communication port to the information processing terminal that inquired the device state.

13 Claims, 6 Drawing Sheets

FIG. 3

| TABLE NUMBER | PRINTER ID | PRINTER INFORMATION | | | |
|---|---|---|---|---|---|
| | | PAGE COUNTER | DRUM COUNTER | TRAY 1 PAPER SIZE | TRAY 2 PAPER SIZE |
| 1 | 50700000001 | 500 | 650 | A4 | A4 |
| 2 | 50700000002 | 124 | 185 | A4 | LETTER |
| 3 | 50700000003 | 1000 | 1500 | LETTER | A4 |
| 4 | 50700000004 | 2000 | 2400 | LETTER | LEGAL |

FIG. 6

| | PAGE COUNTER | DRUM COUNTER | TRAY 1 PAPER SIZE | TRAY 2 PAPER SIZE |
|---|---|---|---|---|
| 1 | 500 | 650 | A4 | A4 |
| 2 | 124 | 185 | A4 | LETTER |
| 3 | 1000 | 1500 | LETTER | A4 |
| 4 | 2000 | 2400 | LETTER | LEGAL |
| 5 | 500 | 650 | A4 | A4 |

| |
|---|
| 50700000001 |
| 50700000002 |
| 50700000003 |
| 50700000004 |
| 50700000001 | ns # IMAGE FORMING APPARATUS, MANAGEMENT INFORMATION PROCESSING TERMINAL, AND STATUS INFORMATION MANAGEMENT SYSTEM

CROSS REFERENCE TO RELATED APPLICATION

This application claims priority from Japanese Patent Application No. 2005-081668 filed on Mar. 22, 2005, the entire subject matter of which is incorporated herein by reference.

TECHNICAL FIELD

The present invention may relate to an image forming apparatus that forms an image on a recording medium and a management information processing terminal, a status information management program, and a status information management system for managing the image forming apparatus.

BACKGROUND

Among printers and other image forming apparatuses connected to a network, an image forming apparatus, which, upon receiving a request from an information processing terminal connected to the network, replies with status information indicating a state of the image forming apparatus, has been known widely from before.

Such an image forming apparatus connected to a network is arranged so that a specific personal computer or other information processing terminal that manages the image forming apparatus is registered in the image forming apparatus in advance, and when accessed by an information processing terminal connected to the network, the image forming apparatus provides to this information processing terminal a response indicating by which information processing terminal the image forming apparatus is being managed (see, for example, JP-A-11-296467).

Among image forming apparatuses that are being used popularly in recent years is an image forming apparatus equipped with a plurality of communication ports (for example, parallel ports, USB ports, etc.,) that enable local connection of information processing terminals.

With the image forming apparatus, different information processing terminals may be connected respectively to the plurality of communication ports, and these information processing terminals may be used in a state of being communicably connected to a management device connected to the same network. In such a case, the management device is arranged to request the information processing terminals for status information that expresses a state of the image forming apparatus, and manages an operation state of the image forming apparatus by acquiring the status information via the information processing terminals.

When in such a state in which different information processing terminals are connected respectively to the plurality of communication ports of the image forming apparatus, the management device requests the status information from the information processing terminals, the plurality of information processing terminals connected to the single image forming apparatus send status information on the same image forming apparatus to the management device. There was thus an issue that excess, redundant data are accumulated in the management device and status information therefore could not be managed appropriately.

In order to prevent the above, a management information processing terminal may be set in advance and the image forming apparatus may be arranged to send the status information just to this management information processing terminal as set forth in JP-A-11-296467. However, with this arrangement, when the management information processing terminal is not started up, the management device cannot acquire status information on the image forming apparatus even when the image forming apparatus is being used.

SUMMARY

One aspect of the present invention may provide a system that enables, in an image forming apparatus, from which status information are acquired by means of a plurality of information processing terminals, the prevention of problems due to non-acquisition of status information or redundant acquisition of status information and thereby appropriately managing the status information.

An image forming apparatus may include: a plurality of communication ports, each of which performs data communication with an information processing terminal; an image forming unit that forms an image on a recording medium in accordance with image data received from a connected information processing terminal; a determining unit that determines, when an inquiry of a device state is received from a first information processing terminal connected to a first communication port, whether a second communication port communicably connected to a second information processing terminal is present, and determines whether, among the communication ports currently connected to the information processing terminals, the first communication port has a highest priority according to a priority order set in advance for the communication ports; and a status information sending controlling unit that sends status information indicating an operating state of the image forming apparatus through the first communication port to the first information processing terminal, when the determining unit determines that the second communication port is not present or that the first communication port has the highest priority.

A management information processing terminal may include: a first communication unit that performs communication with an the image forming apparatus that includes a plurality of communication ports, each of which performs data communication with an information processing terminal, the image forming apparatus performing a process of forming an image on a recording medium in accordance with image data received from the information processing terminal, and performing, upon receiving an inquiry of a device state from an information processing terminal, a process of sending a port information indicating types of the communication ports connected to currently operating devices, and a status information indicating the state of the image forming apparatus, to the information processing terminal that made the inquiry of the device state; a second communication unit that is connected to a network to perform communication with a management apparatus that manages the operation state of the image forming apparatus through the network; an acquisition unit that inquires through the first communication unit to the image forming apparatus of the device state of the image forming apparatus, and acquires the port information and the status information from the image forming apparatus in response to the inquiry; a determining unit that determines, based on the port information acquired by the acquisition unit, whether a second communication port that is communicably connected to another information processing terminal is present in the image forming apparatus, and when the second communication port is present, determines whether, among the communication ports currently connected communicably to the information processing terminals, a first communication port connected to the management information processing terminal has a highest priority according to a priority order set in advance for the respective communication ports; and a sending unit that sends through the second communication unit the status information acquired by the acquisition unit to the management device when the determining unit determines that the second communication port is not present or determines that the first communication port is the communication port having the highest priority.

A computer-readable program product causes a computer to execute the procedures for managing status information, wherein the computer including: a first communication unit that performs communication with an the image forming apparatus that includes a plurality of communication ports, each of which performs data communication with an information processing terminal, the image forming apparatus performing a process of forming an image on a recording medium in accordance with image data received from the information processing terminal, and performing, upon receiving an inquiry of a device state from an information processing terminal, a process of sending a port information indicating types of the communication ports connected to currently operating devices, and a status information indicating the state of the image forming apparatus, to the information processing terminal that made the inquiry of the device state; and a second communication unit that is connected to a network to perform communication with a management apparatus that manages the operation state of the image forming apparatus through the network, wherein the program product causing the computer to execute the procedures including: inquiring through the first communication unit to the image forming apparatus of the device state of the image forming apparatus; acquiring the port information and the status information from the image forming apparatus in response to the inquiry; determining, based on the port information acquired by the acquisition unit, whether a second communication port that is communicably connected to another information processing terminal is present in the image forming apparatus; determining, when the second communication port is present, whether, among the communication ports currently connected communicably to the information processing terminals, a first communication port connected to the management information processing terminal has a highest priority according to a priority order set in advance for the respective communication ports; and sending through the second communication unit the status information acquired by the acquisition unit to the management device when the determining unit determines that the second communication port is not present or determines that the first communication port is the communication port having the highest priority.

A status information management system includes: an image forming apparatuses that includes a plurality of communication ports, each of which performs data communication with an information processing terminal, the image forming apparatus performing a process of forming an image on a recording medium in accordance with image data received from the information processing terminal, and performing, upon receiving an inquiry of a device state from an information processing terminal, a process of sending a port information indicating types of the communication ports connected to currently operating devices, and a status information indicating the state of the image forming apparatus, to the information processing terminal that made the inquiry of the device state; a management device that manages the operation state of the image forming apparatus; and a plurality of information processing terminals, each of the information processing terminals being enabled to communicate with the management device through a network, being respectively connected to the communication ports of the image forming apparatus, and being configured to: inquire, upon receiving from the management device an instruction of requesting status information, the device state to the image forming apparatus; send, upon receiving the status information in response to the inquiry of the device state, a new status information, with which a device identification information for specifying the connected image forming apparatus is added to the received status information, to the management device. The management device includes: a communication unit that performs communication with the information processing terminals that are communicably connected through the network; an acquisition unit that sends through the communication unit to the information processing terminals connected to the management device, an instruction to request the status information from the image forming apparatus connected to the information processing terminals, and acquires the status information in response to the instruction through the communication unit; and an eliminating unit that determines, based on the device identification information included in the status information acquired by the acquisition unit, whether the acquired status information includes status information that is sent from the same image forming apparatus, and eliminates the status information with the exception of one of the status information when there is status information that is sent from the same image forming apparatus.

BRIEF DESCRIPTION OF THE DRAWINGS

In the accompanying drawings:

FIG. 3 is an explanatory diagram of details of the status information table according to the first illustrative aspect;

FIG. 6 an explanatory diagram of details of the status information table according to the third illustrative aspect.

DETAILED DESCRIPTION

Figure 1:
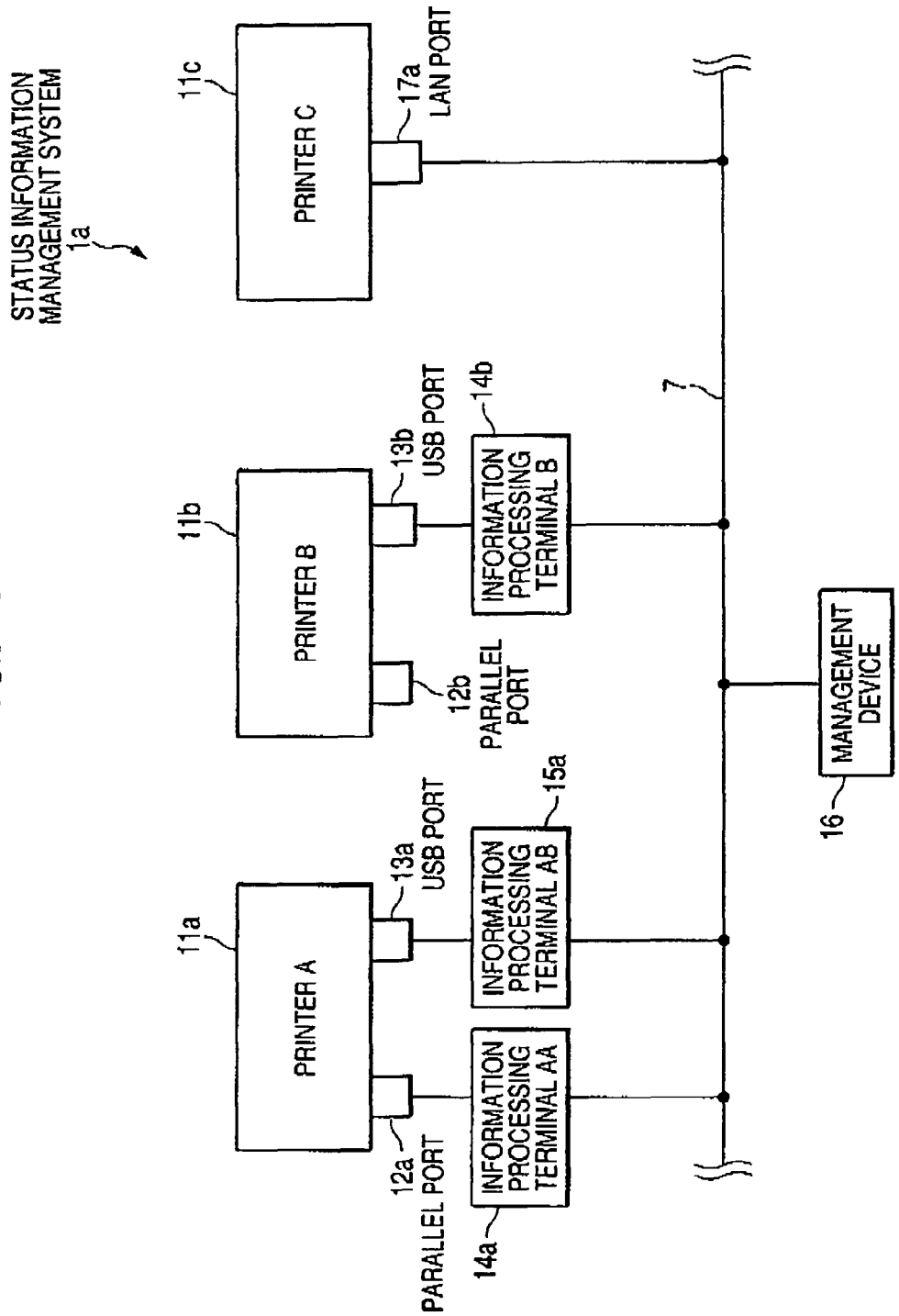
FIG. 1 is a network diagram of a status information management system 1a according to an a first illustrative aspect.

Illustrative aspects of the present invention will be described hereinbelow by reference to the drawings.
First Illustrative Aspect FIG. 1 is a network diagram of a status information management system 1a according to a first illustrative aspect. As shown in FIG. 1, the status information management system 1a includes a plurality of printers 11a to 11c (printer A, printer B, and printer C), information processing terminals 14a, 14b, and 15a (information processing terminals AA, AB, and B, which serves as management information processing terminals) that are connected to the plurality of printers 11a and 11b, and a management device 16 that manages status information (operation states) of the plurality of printers 11a to 11c.

Of the plurality of printers 11a to 11c, each of the printer A 11a and the printer B 11b has a parallel port 12a and 12b that is communication port for performing data transmission by a parallel transmission method and a USB port 13a and 13b that is communication ports for performing data transmission by a USB specification transmission method.

The information processing terminal AA 14a is connected to the parallel port 12a of the printer A 11a, and the information processing terminal AB 15a is connected to the USB port 13a of the printer A 11a.

Nothing is connected to the parallel port 12b of the printer B 11b and the information processing terminal B 14b is connected to the USB port 13b of the printer B 11b.

These printers are arranged to be able to perform data communication with the information processing terminals 14a, 14b, and 15a that are connected via the respective communication ports.

Here, each communication port is allocated with a priority in performing data communication (for example, communication of status information to be described later), and when the USB port 13b and the parallel port 12b are provided as in the illustrative aspect, the parallel port 12b is allocated with a high priority. The priority information is stored in the printers 11a and 11b.

Each of the information processing terminals 14a, 14b, and 15a is connected to a common communication line 7 (for example, a LAN; local area network) and is equipped with a printer server function of sharing and enabling the printer connected to itself to be used from the exterior by other terminals (computer, etc.,) connected via the communication line. That is, each information processing terminal has a function (serving as a first communication unit) of communicating with the printer 11a or 11b that is connected to the terminal itself and a function (serving as a second communication unit) of communicating with the management device 16.

The printer C 11c is connected to the communication line 7 without being connected to an information processing device. That is, the printer C 11c is equipped with a LAN port 17a for connecting directly to the communication line 7.

The LAN port 17a of the printer C 11c is provided with the printer server function that the information processing terminals 14a, 14b, and 15a have, and the printer C 11c is thus set to be able to communicate with the exterior without passing through an information processing device.

Each of the printers 11a to 11c is arranged to form an image according to image data on a paper or other recording medium upon receiving the image data from any of the devices (the information processing terminals 14a, 14b, and 15a, the management device 16, or other devices) connected to the communication line 7.

Here, with the printers 11a and 11b that are connected to the communication line 7 via the information processing terminals 14a, 14b, and 15a, image data are received via the information processing terminals 14a, 14b, and 15a.

Each of the printers 11a to 11c is furthermore set to perform a status information management process, to be described later, upon receiving a request for status information concerning itself.

Each of the information processing terminals 14a, 14b, and 15a, upon receiving image data from the exterior or when sending an image forming instruction from itself to the printer among the printers 11a to 11c that is connected to the terminal itself, sends the image data to the corresponding printer among the printers 11a to 11c.

Also upon receiving a status information request from a device (here, the management device 16) connected to the communication line, each of the information processing terminals 14a, 14b, and 15a requests status information from the printer that is connected to the terminal itself.

The management device 16 is connected to the communication line 7 and is arranged to be able to communicate with the respective devices connected to the communication line 7 (and thus corresponds to being a communication unit as referred to in The present invention). The management device 16 is communicably connected to the communication line 7 and is arranged to request status information on the printers 11a to 11c from devices that have been set in advance and accumulate and manage the status information returned from these devices.

Figure 2:
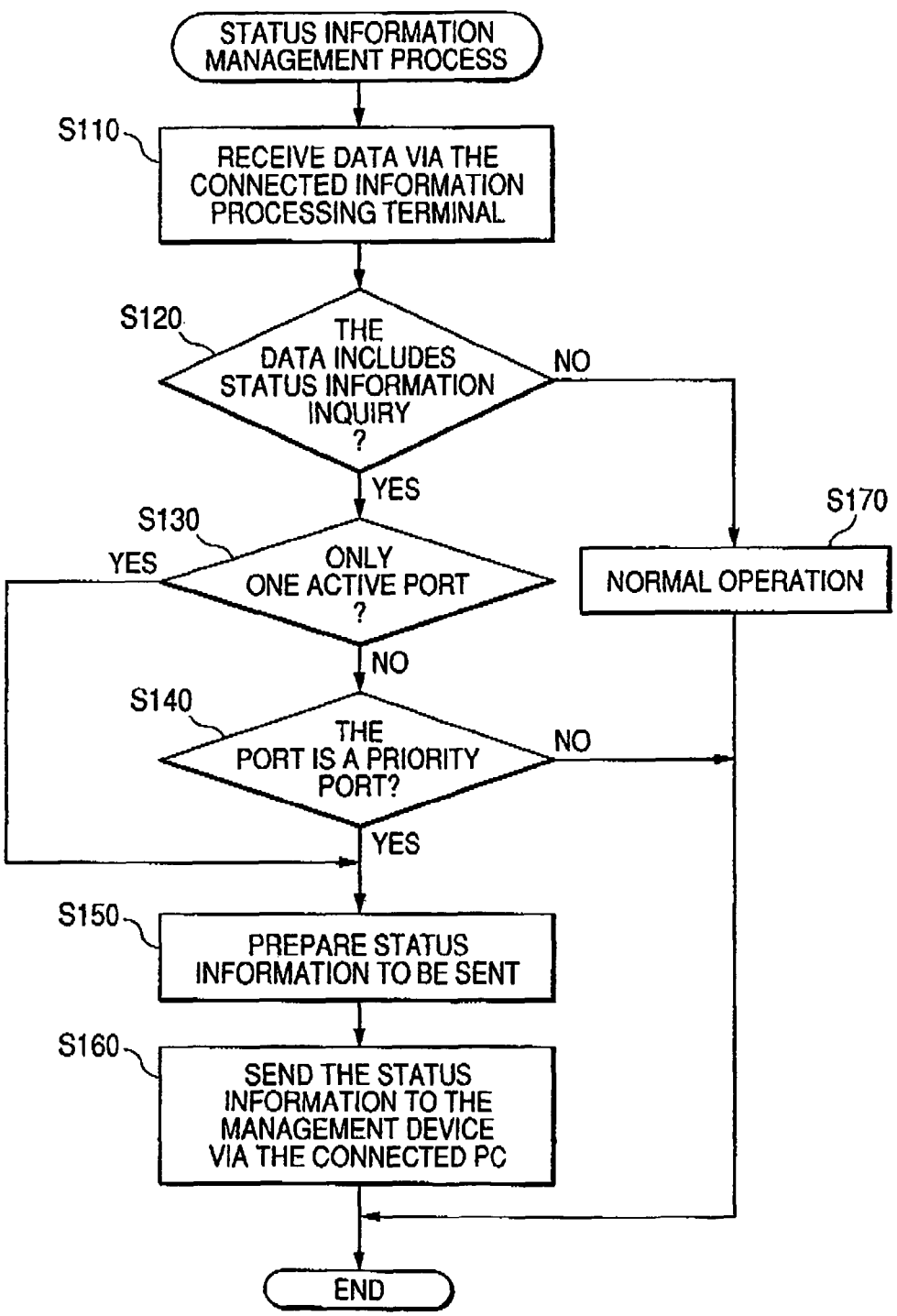
FIG. 2 is a flowchart of a status information management process according to a first illustrative aspect.

A process by which the management device 16 acquires the status information of the respective printers 11a to 11c shall now be described with reference to FIG. 2. FIG. 2 is a flowchart of the status information management process executed by the printer A 11a. In this process, the process of S120 to S140 serves as a determining unit and the process of S150 and S160 serves as an information communication controlling unit.

This process is executed when the management device 16 sends an instruction for requesting status information to the information processing terminals 14a, 14b, or 15a and the printer A 11a starts receiving data from the connected information processing terminals 14a or 15a. First, the data are received in S110.

Next, the process proceeds to S120 and whether the content of the data is an inquiry for status information is determined. If the content is an inquiry for status information, the process proceeds to S130 and if the content is otherwise, the process proceeds to S170.

In S170, a normal operation that is in accordance with the type of the received data (for example, if image data are received, a process of forming an image on a recording medium) is performed and the status information management process is terminated.

In S130, whether the number of active ports is one is determined. That is, it is determined whether there is only one port that is connected to a currently operating information processing terminal. If there is only one active port, the process proceeds to S150 and if there are two or more active ports, the process proceeds to S140.

As a specific process of S130, if the information processing terminals 14a and 15a are connected to two or more communication ports and these information processing terminals 14a and 15a are operating, as is the case with printer A 11a, the process proceeds to S140 since there are two or more active ports. Also, if two or more communication ports are equipped but an information processing terminal is connected to only one of these ports as is the case with printer B 11b or only one communication port is equipped as is the case with printer C 11c, the process proceeds to S150 since there is just one active port.

In S140, it is determined whether the communication port connected to the information processing terminal that made the status information inquiry is a priority port (a port of the highest priority). If the communication port connected to the information processing terminal that made the status information inquiry is a priority port, the process proceeds to S150, while if the communication port connected to the information processing terminal that made the status information request is not a priority port, the status information management process is terminated.

Specifically, since for example in the present illustrative aspect, the parallel port 12a is set to a communication port of high priority, if the status information inquiry is received from the information processing terminal AA 14a, the process proceeds to S150, while if the status information inquiry is received from the information processing terminal AB 15a, the status information management process is terminated. That is, settings are made so that status information is not sent to an information processing terminal connected to a communication port besides the priority port.

Next, in S150, the status information to be sent is prepared and the process proceeds to S160.

In S160, the status information is sent to the information processing terminal that made the status information inquiry and the status information management process is terminated.

The information processing terminal that received the status information from the printer A 11a sends the status information to the management device 16.

Upon receiving the status information from the respective printers 11a to 11c via the respective information processing terminals, the management device 16 prepares and manages a status information table as shown in FIG. 3. FIG. 3 is an explanatory diagram of details of the status information table.

As shown in FIG. 3, the status information received from the respective printers 11a to 11c include printer IDs (device identification information as referred to in The present invention) for identifying the respective printers 11a to 11c and printer information (serving as a maintenance information).

In particular, each printer ID is, for example, an eleven digit numeral, with the upper four digits being a model code that expresses a type of the corresponding printer among the printers 11a to 11c and the lower seven digits being an individual unit number (serving as a serial number) of the corresponding printer among the printers 11a to 11c. Since the printer ID is thus a unique number that is set according to each printer, the management device 16 can identify the printers 11a to 11c using these printer IDs.

The printer information includes page counter information that expresses the number of page printed and drum counter information that expresses the number of rotations of a photoconductor drum at each of the printers 11a to 11c and information on the size of the paper (recording medium) set in each of the printers 11a to 11c.

Of these printer information, the page counter information and the drum counter information can be used as maintenance information that indicates information concerning the deterioration of the respective parts making up each of the printers 11a to 11c.

With the status information management system 1a described in detail above, each of the printers 11a and 11b is equipped with a plurality of communication ports for performing data communication with the connected information processing terminal 14a, 14b, or 15a. Upon receiving image data from the connected information processing terminal 14a, 14b, or 15a, the corresponding printer 11a or 11b forms an image based on the received image data on a recording medium, and upon receiving an inquiry of the device state from the information processing terminal 14a, 14b, or 15a, the corresponding printer 11a or 11b determines whether a communication port that is communicably connected to the information processing terminal 14a, 14b, or 15a is present besides the communication port that received the inquiry. If a communication port besides the communication port that received the inquiry is present, the corresponding printer 11a or 11b determines, according to a priority order set in advance for the respective communication ports, whether the communication port that received the inquiry is a communication port of the highest priority among the communication ports communicably connected to the information processing terminal 14a, 14b, or 15a. If it is then determined that a communication port besides the communication port that received the inquiry is not present or that the communication port that received the inquiry is the communication port of the highest priority, the corresponding printer 11a or 11b sends, from the communication port that received the inquiry, the status information expressing the operation state of the device, to the information processing terminal 14a, 14b, or 15a that inquired the device state.

Thus with the printers 11a and 11b, even if the plurality of information processing terminals 14a, 14b, and 15a are respectively connected to the plurality of communication ports, since the status information are sent only to the information processing terminal 14a, 14b, or 15a that is connected to the communication port of high priority, redundant acquisition of the status information of one printer among the printers 11a and 11b can be prevented. Thus when the printers 11a and 11b are connected to the management device 16 that manages the operation states of the devices, the status information can be managed favorably at the management device 16.

Also with the system 1a, the status information sent by the printers 11a and 11b include device identification information for identifying the printers 11a and 11b and maintenance information expressing information on deterioration of the components of the printers 11a and 11b.

Thus with the printers 11a and 11b, even if status information from the plurality of printers 11a and 11b are sent to the information processing terminals 14a, 14b, and 15b, the printers 11a and 11b can be identified at the information processing terminals 14a, 14b, and 15b. Also since the maintenance information are sent to the information processing terminals 14a, 14b, and 15a, the timing of exchange of a component, etc., can be ascertained at the information processing terminals 14a, 14b, and 15a.

Furthermore with the system 1a, the device identification information sent by each of the printers 11a and 11b includes the model code, expressing the type of the printer 11a or 11b, and the serial number unique to the printer 11a or 11b. Also, as the specific maintenance information sent by each of the printers 11a and 11b, the information on the remaining amounts of ink or toner for forming an image on a recording medium or the page counter information expressing the number of recording media on which image forming has been performed using the image forming unit is included.

Thus with the printers 11a and 11b, since the model code and the serial number are sent to the information processing terminals 14a, 14b, and 15a, the printers 11a and 11b can be identified more precisely at the information processing terminals 14a, 14b, and 15a.

Also with the system 1a, parallel ports used to transmit data by a parallel transmission method, and USB ports used to transmit data by a USB specification transmission method, are equipped as the plurality of communication ports in the printers 11a and 11b, and the parallel ports are set as communication ports of higher priority than the USB ports.

Thus with the printers 11a and 11b, the information processing terminal 14a, 14b, or 15a that manages the printer 11a or 11b can be specified readily.

The configuration of the status information management system 1a will not be restricted to the above-described illustrative aspect and may take on various modifications that falls within a technical scope of the claimed invention.

For example, in the illustrative aspect, information on the remaining amounts of toners may be included in and acquired as the status information. In the case of using the management device 16 to manage the state of an inkjet type printer, information on the remaining amounts of ink may be included in and acquired as the status information.

Second Illustrative Aspect

A status information management system 1b according to a second illustrative aspect shall now be described. The status information management system 1b to be described as the second illustrative aspect differs only in the arrangement of the process by which the management device 16 receives the status information from the respective printers 11a to 11c, and the arrangements of other portions are the same as those of the status information management system 1a of the first illustrative aspect. Thus for the second illustrative aspect, only the configurations different with respect to the status information management system 1a of the first illustrative aspect shall be described in detail and configurations that are the same as those of the status information management system 1a of the first illustrative aspect shall be denoted with the same symbols and description thereof shall be omitted.

With the second illustrative aspect, each of the printers 11a to 11c is arranged so that when it receives an inquiry concerning active ports or status information from the exterior, a reply to the inquiry is sent to the source of inquiry unconditionally and without determining whether the source of inquiry is connected to a priority port.

Figure 4:
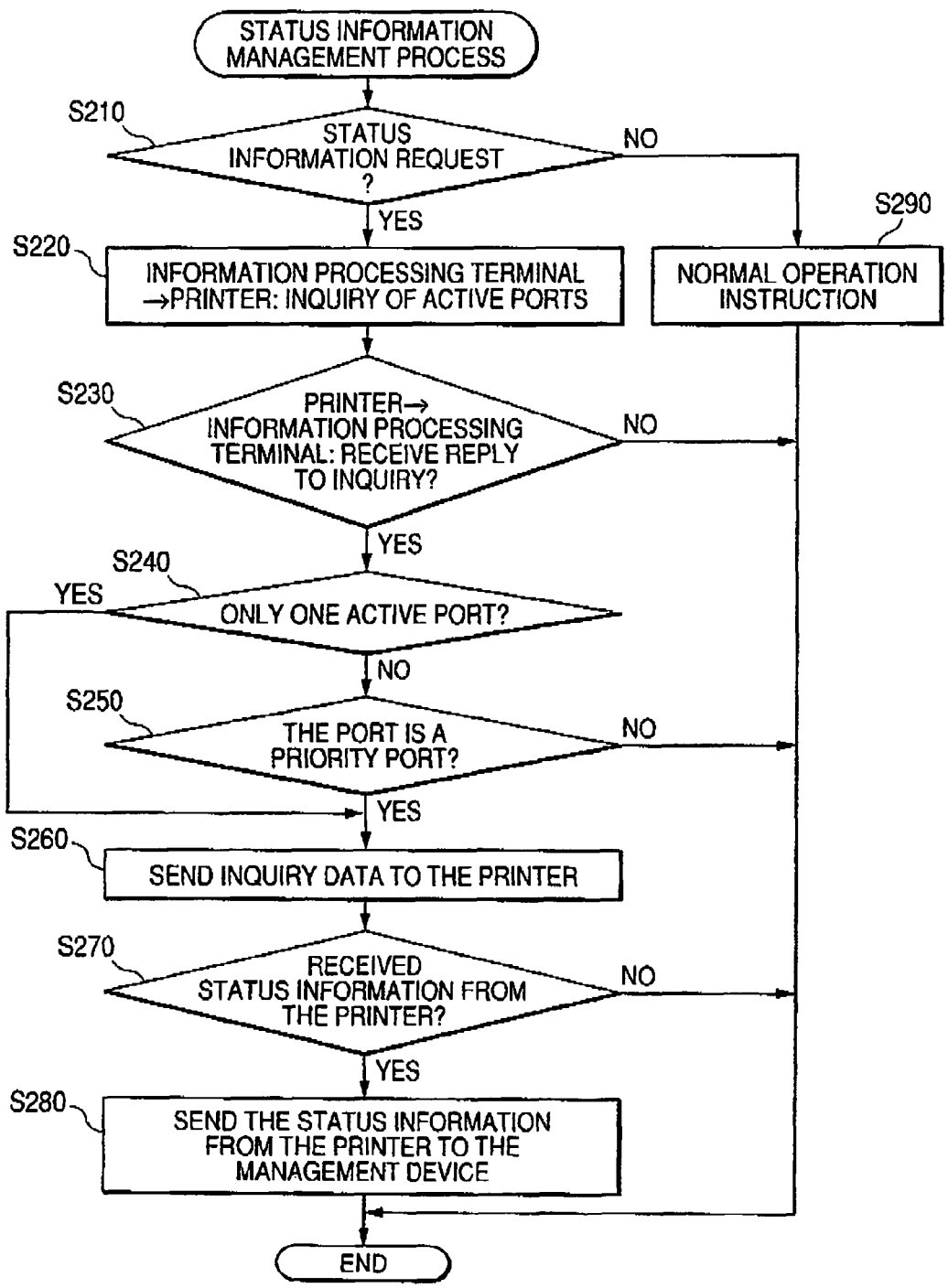
FIG. 4 is a flowchart of a status information management process according to a second illustrative aspect.

Each of the information processing terminals 14a, 14b, and 15a connected to the printers 11a and 11b executes a process shown in FIG. 4. FIG. 4 is a flowchart of a status information management process that each of the information processing terminals 14a, 14b, and 15a executes based on a program stored in its own interior. In this process, the process of S220 and S230 serves as an acquisition unit, the process of S240 and S250 serves as a determining unit, and the process of S280 serves as a sending unit.

The status information management process is executed when the information processing terminal 14a, 14b, or 15a receives an instruction from the exterior, and first, in S210, whether the instruction is an inquiry for status information is determined. If the instruction is an inquiry for status information, S220 is entered and if the content of the instruction is something else, S290 is entered.

In S290, a normal operation instruction that is in accordance with the type of the received data (for example, if image data are received, an instruction to form an image on a recording medium) is sent to the connected printer and the status information management process is terminated.

On the other hand, in S220, the printer among the printers 11a to 11c that is connected to the information processing terminal 14a, 14b, or 15a that received the inquiry is inquired of the number of active ports for the printer.

Then in S230, it is determined whether an inquiry result has been received from the connected printer among the printers 11a to 11c within a predetermined time. If the inquiry result has been received within the predetermined time, the process proceeds to S240, while if the inquiry result has not been received within the predetermined time, the status information management process is terminated.

Next in S240, whether there is one active port is determined based on the inquiry result concerning active ports that was received from the corresponding printer among the printers 11a to 11c. If the number of active ports is one, the process proceeds to S260, and if there are two or more active ports, the process proceeds to S250.

Next in S250, it is determined whether the communication port of the corresponding printer among the printers 11a to 11c that is connected to the information processing terminal is a priority port (a port of the highest priority). In the illustrative aspect, information on the priority order of the communication ports is stored in advance in the information processing terminals 14a, 14b, and 15a.

If in this process, the communication port of the printer among the printers 11a to 11c that is connected to the information processing terminal is a priority port, the process proceeds to S260, while if the communication port of the printer among the printers 11a to 11c that is connected to the information processing terminal is not a priority port, the status information management process is terminated.

Then in S260, the status information inquiry data are sent to the connected printer among the printers 11a to 11c and the process proceeds to S270.

In S270, it is determined whether an inquiry result has been received from the corresponding printer among the printers 11a to 11c within a predetermined time. If the inquiry result has been received within the predetermined time, the process proceeds to S280, while if the inquiry result has not been received within the predetermined time, the status information management process is terminated.

Then in S280, the status information received from the corresponding printer among the printers 11a to 11c is sent to the management device 16 and the status information management process is terminated.

The information processing terminals 14a, 14b, and 15a of the second illustrative aspect, described in detail above, are connected to the printers 11a and 11b and are equipped with the communication function for communicating with the printers 11a and 11b and the management device 16.

The information processing terminals 14a, 14b, and 15a make inquiries of the device states of the printers 11a and 11b to the printers 11a and 11b and acquire port information and status information in response to these inquiries from the printers 11a and 11b.

Based on the acquired port information, each of the information processing terminals 14a, 14b, and 15a determines whether a communication port that is communicably connected to another information processing terminal among the information processing terminal 14a, 14b, or 15a is present in the connected printer 11a or 11b.

If a communication port that is communicably connected to another information processing terminal among the information processing terminals 14a, 14b, and 15a is present in the connected printer 11a or 11b, each of the information processing terminals 14a, 14b, and 15a determines, in accordance with the priority order set for the respective communication ports, whether the communication port connected to itself is the communication port of the highest priority among the communication ports that are currently connected communicably to the information processing terminals 14a, 14b, and 15a.

If it is determined that a communication port that is communicably connected to another information processing terminal among the information processing terminals 14a, 14b, and 15a is not present or it is determined that the communication port connected to itself is the port of the highest priority, the corresponding information processing terminal 14a, 14b, or 15a makes the status information be sent to the management device 16.

Each of the printers 11a and 11b performs a process of forming an image on a recording medium based on image forming data received from the information processing terminal 14a, 14b, or 15b, and upon receiving an inquiry of the device state from the information processing terminal 14a, 14b, or 15b, performs a process of sending the port information expressing the types of the communication ports connected to currently operating devices, and the status information expressing the state of the device itself, to the information processing terminal 14a, 14b, or 15a that is the source of inquiry of the device state.

Thus with the information processing terminals 14a, 14b, and 15a, even if the plurality of information processing terminals 14a, 14b, and 15a are respectively connected to the plurality of communication ports, since the status information is sent only to the information processing terminal 14a, 14b, or 15a that is connected to the communication port of high priority, redundant acquisition of the status information of one printer 11a or 11b can be prevented. The management device 16 that manages the operation states of the printers 11a and 11b can thus manage the status information favorably.

Third Illustrative Aspect

A status information management system 1c according to a third illustrative aspect shall now be described. As with the status information management system 1b of the second illustrative aspect, the status information management system 1c to be described as the third illustrative aspect differs only in the arrangement of the process by which the management device 16 receives the status information from each of the printers 11a to 11c. Thus configurations that are the same as those of the status information management systems 1a and 1b of the first and the second illustrative aspects shall be denoted with the same symbols and description thereof shall be omitted.

With the third illustrative aspect, each of the printers 11a to 11c is arranged so that when it receives an inquiry concerning active ports or status information from the exterior, a reply to the inquiry is sent to the source of inquiry unconditionally and without determining whether the source of inquiry is connected to a priority port.

Upon receiving an instruction requesting for status information from the management device 16, each of the information processing terminals 14a, 14b, and 15a inquires the corresponding printer among the printers 11a to 11c for status information and upon receiving the status information corresponding to the device state inquiry from the corresponding printer among the printers 11a to 11c, sends the status information to the management device 16.

Figure 5:
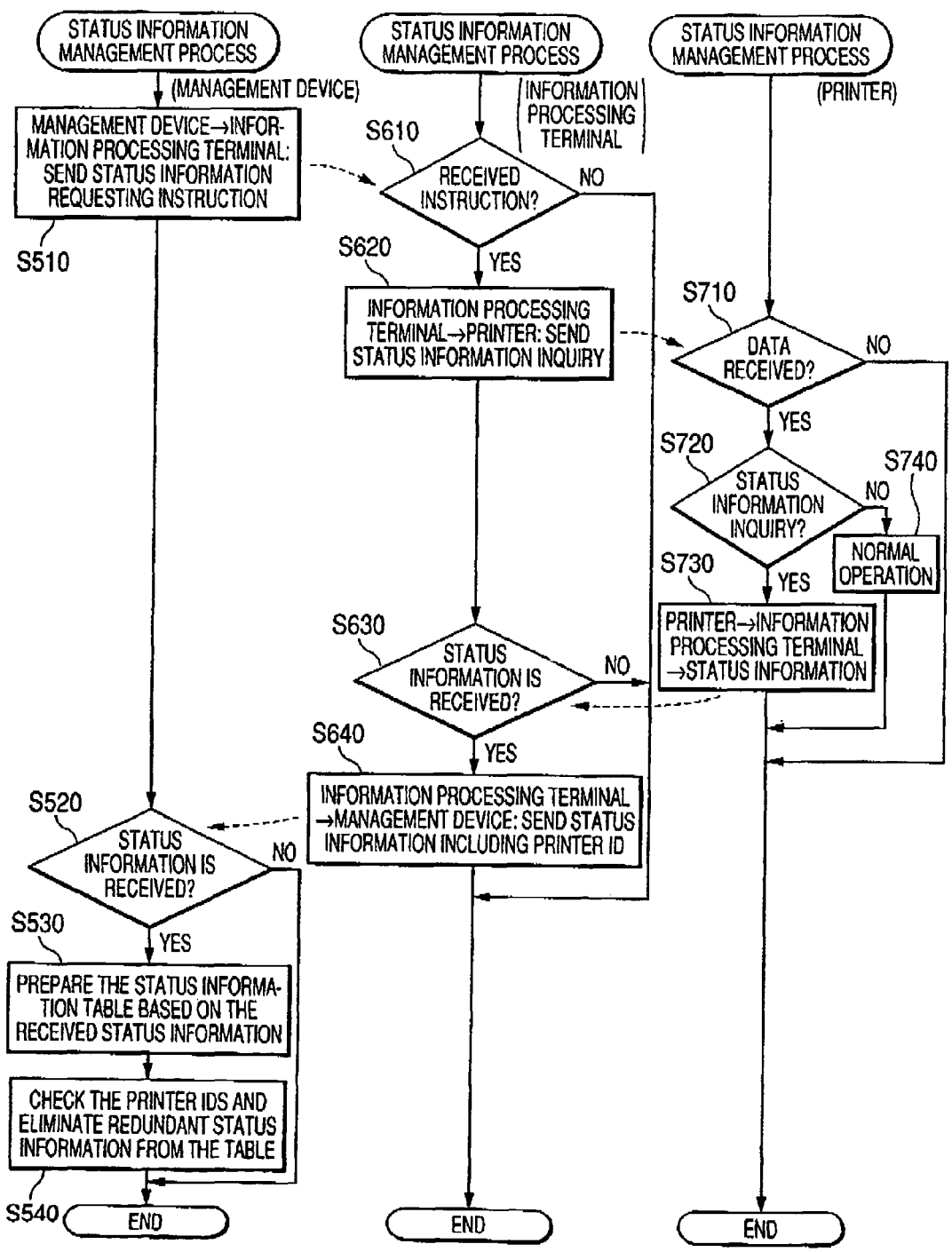
FIG. 5 is a flowchart of a status information management process according to a third illustrative aspect.

That is, with the status information management system 1c of the third illustrative aspect, a status information management process shown in FIG. 5 is executed. FIG. 5 is a flowchart of a status information management process that the management device 16, the information processing terminal 14a, 14b, and 15a, and the printers 11a to 11c perform in a cooperating manner. In this process, the process of S510 and S520 serves as an acquisition unit and the process of S540 serves as an eliminating unit.

The status information management process starts when the management device 16 begins to send instructions requesting status information to the printers 11a to 11c.

If the information processing terminals 14a, 14b, and 15a are connected, as is the case with the printers 11a and 11b, the management device 16 sends the instructions requesting the status information to the information processing terminals 14a, 14b, and 15a.

In this process, the management device 16 sends the instructions requesting the status information to the information processing terminals 14a, 14b, and 15a in S510. Next, the process proceeds to S520.

Here, each of the information processing terminals 14a, 14b, and 15a starts the process at each predetermined time and in S610, determines whether the instruction requesting the status information has been received from the management device 16. If the instruction requesting the status information has been received from the management device 16, S620 is entered, while if the instruction requesting the status information has not been received from the management device 16, the status information management process in the corresponding information processing terminal 14a, 14b, or 15a is terminated.

In S620, a status information inquiry is sent to the printer among printers 11a to 11c that is connected to the information processing terminal itself and the process proceeds to S630.

Here, each of the printers 11a to 11c starts the process at each predetermined time and in S710, determines whether any data have been received from the corresponding information processing terminal 14a, 14b, or 15a. If data have been received, S720 is entered while if data have not been received, the status information management process in the corresponding printer among the printers 11a to 11c is terminated.

In S720, whether or not the received data is a status information inquiry is determined. If the received data is the status information inquiry, S730 is entered while if the received data is not the status information inquiry, the process proceeds to S740.

In S740, a normal operation that is in accordance with the type of the received data (for example, if image data are received, a process of forming an image on a recording medium) is performed and the status information management process in the corresponding printer among the printers 11a to 11c is terminated.

In S730, a status information is sent to the corresponding information processing terminal 14a, 14b, or 15a and the status information management process in the corresponding printer among the printers 11a to 11c is terminated. Here, the status information sent in S730 does not include printer ID information.

In S630 of the process in each of the information processing terminals 14a, 14b, and 15a, it is determined whether the status information sent from the corresponding printer among the printers 11a to 11c (the status information sent in the process of S730) has been received within a predetermined time. If the status information has been received within the predetermined time, the process proceeds to S640, while if the status information has not been received within the predetermined time, the status information management process in the corresponding information processing terminal 14a, 14b, or 15a is terminated.

In S640, a new status information is generated by adding a printer ID that is stored in advance in the corresponding information processing terminal 14a, 14b, or 15a to the received status information, this new status information is sent to the management device 16, and the status information management process in the corresponding information processing terminal 14a, 14b, or 15a is terminated.

In S520 of the process in the management device 16, it is determined whether or not a reply has been received within a predetermined time from the sending destination to which the status information requesting instruction was sent in S510. That is, it is determined whether the status information sent in the process of S640 to be described later has been received.

In S520, if the status information has been received within the predetermined time, the process proceeds to S530, while if the status information has not been received within the predetermined time, the status information acquisition process in the management device 16 is terminated.

In S530, a status information table, such as that shown in FIG. 6, is prepared.

Next, the process proceeds to S540, a printer ID column in the status information table is referenced, and if there are redundant status information with the same printer ID, these redundant status information are eliminated with the exception of one of the status information and then the status information management process in the management device 16 is terminated.

As a specific process of S540, if there are redundant status information with the same printer ID, the status information corresponding to the redundant printer ID are ignored with the exception of the status information with the lowest table number. For example, with the status information table of FIG. 6, the printer ID is redundant for table numbers "1" and "5," and the status information of table number "5" is ignored.

The management device 16 is then prohibited to communicate subsequently with the information processing terminal 14*a*, 14*b*, or 15*a* corresponding to the table number for which the status information was ignored (this process serves as a prohibiting unit). This prohibition setting is canceled after the elapse of a predetermined time (for example, one hour).

Also when the management device 16 sends the status information requesting instruction to the printer C 11*c*, the process executed in the information processing terminals in the status information management process is omitted and the management device 16 communicates directly with the printer C 11*c*.

The status information management system 1*c* that has been described in detail above includes: the printers 11*a* and 11*b*, each of which in turn includes the plurality of communication ports for performing data communication with the external information processing terminals 14*a*, 14*b*, and 15*a*, performs a process of forming an image on a recording medium based on image forming data received from the information processing terminals 14*a*, 14*b*, and 15*a* and, upon receiving an inquiry of the device state from an information processing terminal 14*a*, 14*b*, or 15*a*, performs a process of sending the status information expressing the device state, to the information processing terminal 14*a*, 14*b*, or 15*a* that is the source of the device state inquiry; the management device 16, which manages the operation states of the printers 11*a* and 11*b*, and the plurality of information processing terminals 14*a*, 14*b*, and 15*a*, each of which is enabled to communicate with the management device 16 via the common network, is respectively connected to a communication port of the printer 11*a* or 11*b*, and upon receiving, from the management device 16, the instruction for requesting the status information, makes an inquiry of the device state to the printer 11*a* or 11*b* and upon receiving the status information according to the device state inquiry, sends, to the management device 16, a new status information, with which the device identification information for specifying the connected printer 11*a* or 11*b* is added to the received status information.

The management device 16 is equipped with the communication function for performing communication with the plurality of information processing devices that are communicably connected via the network. The management device 16 sends, to the information processing terminals 14*a*, 14*b*, and 15*a* that are connected to the management device 16, the instruction of requesting the status information of the printers 11*a* and 11*b* connected to the information processing terminals and acquires the status information corresponding to the instruction. Furthermore the management device 16 determines, based on the device identification information included in the status information, whether the acquired status information include status information that have been sent from the same printer among the printers 11*a* and 11*b* and, if there are status information that have been sent from the same printer among the printers 11*a* and 11*b*, eliminates the status information with the exception of one of the status information.

According to the status information management system 1*c*, even if redundant status information are acquired from printers 11*a* and 11*b*, with which the plurality of information processing terminals 14*a*, 14*b*, and 15*a* are respectively connected with the plurality of communication ports, the status information besides one of the status information can be eliminated. The status information can thus be managed favorably.

According to the status information management system 1*c*, the management device 16 prohibits the sending of instructions to the information processing terminals among the information processing terminals 14*a*, 14*b*, and 15*a* that sent the status information that were eliminated.

According to the status information management system 1*c*, when the status information of the printers 11*a* and 11*b* are received a plurality of times, the wasteful communication of the second time onward can be eliminated.

Furthermore, according to the status information management system 1*c*, the status information, included in the status information that the management device 16 receives from each of the information processing terminals 14*a*, 14*b*, and 15*a*, includes the model code, expressing the type of the corresponding printer 11*a* or 11*b*, and the serial number unique to the corresponding printer 11*a* or 11*b*.

According to the status information management system 1*c*, since the information processing terminals 14*a*, 14*b*, and 15*a* send the model codes and the serial numbers to the management device 16, the printers 11*a* and 11*b* can be identified more precisely at the management device 16.

According to the status information management system 1*c*, the status information that the management device 16 receives from each of the information processing terminals 14*a*, 14*b*, and 15*a* includes maintenance information expressing information on deterioration of components of the corresponding printer 11*a* or 11*b*, and the maintenance information includes the information on remaining amounts of ink or toner for forming an image on a recording medium or the page counter information expressing the number of recording media on which image forming has been performed using the image forming unit.

According to the status information management system 1*c*, since the management device 16 can receive the maintenance information via the information processing terminals 14*a*, 14*b*, and 15*a*, the timing of exchange of a component, etc., can be ascertained at the information processing terminals 14*a*, 14*b*, and 15*a*.

In the illustrative aspects described in detail in the above, new status information are prepared at the respective information processing terminals 14*a*, 14*b*, and 15*a* by adding printer IDs for specifying the printers 11*a* to 11*c* and the resulting status information are sent to the management device 16. However, status information, with the printer IDs being added from the beginning may instead be prepared at the printers 11*a* to 11*c*.

As described above in detail, according to the illustrative aspects, there is provided the following configurations.

(1) An image forming apparatus including: a plurality of communication ports, each of which performs data communication with an information processing terminal when connected to the information processing terminal; an image forming unit that is forms an image on a recording medium in accordance with image data received from a connected information processing terminal; a determining unit that determines, when an inquiry of a device state is received from a first information processing terminal connected to a first communication port, whether a second communication port communicably connected to a second information processing terminal is present, and determines whether, among the communication ports currently connected to the information processing terminals, the first communication port has a highest priority according to a priority order set in advance for the communication ports; and a status information sending controlling unit that sends status information indicating an operating state of the image forming apparatus through the first communication port to the first information processing terminal, when the determining unit determines that the second communication port is not present or that the first communication port has the highest priority.

According to the configuration of (1), since even when a plurality of information processing terminals are respectively connected to the plurality of communication ports, the status information is sent only to the information processing terminal connected to the communication port of high priority, redundant acquisition of the status information of a single image forming apparatus can be prevented. Thus when a management device that manages the operation state of the image forming apparatus is connected to the image forming apparatus, the status information can be managed favorably at the management device.

In the image forming apparatus, the number of the second communication ports may be arbitrary, and one or more of the second communication ports may be provided in the image forming apparatus.

(2) In the image forming apparatus according to (1), the status information sending controlling unit may be configured to send the status information including device identification information for identifying the image forming apparatus, and maintenance information indicating deterioration of components of the image forming apparatus.

According to the configuration of (2), even if the status information from a plurality of image forming apparatuses are sent to the information processing terminals, the image forming apparatuses can be identified at the information processing terminals. Also with this image forming apparatus, since the maintenance information is sent to the information processing terminal, the timing of exchange of a component, etc., can be ascertained at the information processing terminal.

(3) In the image forming apparatus according to (2), the status information sending controlling unit may be configured to send the device identification information including a model code that for identifying a type of the image forming apparatus, and a serial number unique to the image forming apparatus.

(4) In the image forming apparatus according to (2), the status information sending controlling unit may be configured to send the maintenance information including at least one of information on remaining amount of ink or toner for forming the image, and page counter information that indicates a number of recording medium on which image forming is performed by the image forming unit.

According to the configuration of (4), since the model code and the serial number are sent to the information processing terminal, the image forming apparatus can be identified more precisely at the information processing terminal.

In the image forming apparatus according to (1), the communication ports may be configured to include a parallel port that transmits data by a parallel transmission method, and a USB port that transmits data by a USB specified transmission method, and the parallel port may be configured to have the higher priority than the USB port.

A cable that is connected to a USB port may be branched using hub and a plurality of information processing terminals may be connected to the branches. Since it may thus not be possible to specify a single information processing terminal with a USB port, it is preferable to set the parallel ports, with which branching is comparatively difficult, higher in priority.

Thus according to the configuration of (5), the information processing terminal that manages the image forming apparatus can be specified readily.

In the image forming apparatus according to (1), the determining unit may be configured to include: an inquiry determining unit that determines whether the inquiry of the device state is received from the first information processing terminal; a second communication port presence determining unit that determines whether the second communication port is present when the inquiry determining unit determines that the inquiry is received; and a priority determining unit that determines, when the second communication port presence determining unit determines that the second communication port is present, whether, among the communication ports currently connected to the information processing terminals, the first communication port has the highest priority according to the priority order set in advance for the communication ports.

That is, the operations performed by the determining unit may be configured to be executed by a plurality of determining units. Such an image forming apparatus provides the same advantages as the image forming apparatus described above.

(7) A management information processing terminal includes: a first communication unit that performs communication with an the image forming apparatus that includes a plurality of communication ports, each of which performs data communication with an information processing terminal, the image forming apparatus performing a process of forming an image on a recording medium in accordance with image data received from the information processing terminal, and performing, upon receiving an inquiry of a device state from an information processing terminal, a process of sending a port information indicating types of the communication ports connected to currently operating devices, and a status information indicating the state of the image forming apparatus, to the information processing terminal that made the inquiry of the device state; a second communication unit that is connected to a network to perform communication with a management apparatus that manages the operation state of the image forming apparatus through the network; an acquisition unit that inquires through the first communication unit to the image forming apparatus of the device state of the image forming apparatus, and acquires the port information and the status information from the image forming apparatus in response to the inquiry; a determining unit that determines, based on the port information acquired by the acquisition unit, whether a second communication port that is communicably connected to another information processing terminal is present in the image forming apparatus, and when the second communication port is present, determines whether, among the communication ports currently connected communicably to the information processing terminals, a first communication port connected to the management information processing terminal has a highest priority according to a priority order set in advance for the respective communication ports; and a sending unit that sends through the second communication unit the status information acquired by the acquisition unit to the management device when the determining unit determines that the second communication port is not present or determines that the first communication port is the communication port having the highest priority.

The management information processing terminal according to (7) provides the same advantages as set forth in the configuration of (1). That is, the advantage that even if a plurality of information processing terminals are connected respectively to the plurality of communication ports, since the status information is sent only to the information processing terminal connected to the communication port of high priority, the status information of a single image forming apparatus can be prevented from being acquired redundantly by the management device. The management device that manages the operation state of the image forming apparatus can thus manage the status information favorably.

(8) There is also provided a computer-readable program product causing a computer to execute the procedures for managing status information, wherein the computer includes: a first communication unit that performs communication with an the image forming apparatus that includes a plurality of communication ports, each of which performs data communication with an information processing terminal, the image forming apparatus performing a process of forming an image on a recording medium in accordance with image data received from the information processing terminal, and performing, upon receiving an inquiry of a device state from an information processing terminal, a process of sending a port information indicating types of the communication ports connected to currently operating devices, and a status information indicating the state of the image forming apparatus, to the information processing terminal that made the inquiry of the device state; and a second communication unit that is connected to a network to perform communication with a management apparatus that manages the operation state of the image forming apparatus through the network. The program product causes the computer to execute the procedures including: inquiring through the first communication unit to the image forming apparatus of the device state of the image forming apparatus; acquiring the port information and the status information from the image forming apparatus in response to the inquiry; determining, based on the port information acquired by the acquisition unit, whether a second communication port that is communicably connected to another information processing terminal is present in the image forming apparatus; determining, when the second communication port is present, whether, among the communication ports currently connected communicably to the information processing terminals, a first communication port connected to the management information processing terminal has a highest priority according to a priority order set in advance for the respective communication ports; and sending through the second communication unit the status information acquired by the acquisition unit to the management device when the determining unit determines that the second communication port is not present or determines that the first communication port is the communication port having the highest priority.

According to the configuration of (8), the same advantages as that of the configuration of (7) are obtained.

(9) There is provided a status information management system including: an image forming apparatuses that includes a plurality of communication ports, each of which performs data communication with an information processing terminal, the image forming apparatus performing a process of forming an image on a recording medium in accordance with image data received from the information processing terminal, and performing, upon receiving an inquiry of a device state from an information processing terminal, a process of sending a port information indicating types of the communication ports connected to currently operating devices, and a status information indicating the state of the image forming apparatus, to the information processing terminal that made the inquiry of the device state; a management device that manages the operation state of the image forming apparatus; and a plurality of information processing terminals, each of the information processing terminals being enabled to communicate with the management device through a network, being respectively connected to the communication ports of the image forming apparatus, and being configured to: inquire, upon receiving from the management device an instruction of requesting status information, the device state to the image forming apparatus; send, upon receiving the status information in response to the inquiry of the device state, a new status information, with which a device identification information for specifying the connected image forming apparatus is added to the received status information, to the management device. The management device includes: a communication unit that performs communication with the information processing terminals that are communicably connected through the network; an acquisition unit that sends through the communication unit to the information processing terminals connected to the management device, an instruction to request the status information from the image forming apparatus connected to the information processing terminals, and acquires the status information in response to the instruction through the communication unit; and an eliminating unit that determines, based on the device identification information included in the status information acquired by the acquisition unit, whether the acquired status information includes status information that is sent from the same image forming apparatus, and eliminates the status information with the exception of one of the status information when there is status information that is sent from the same image forming apparatus.

According to the status information management system of (9), even if redundant status information are acquired from an image forming apparatus, with which the plurality of information processing terminals are respectively connected with the plurality of communication ports, the status information besides a single status information can be eliminated. The status information can thus be managed favorably.

(10) In the status information management system of (9), the management device may be configured to further include a prohibiting unit that prohibits the acquiring unit from sending the instruction to the information processing terminals that sent the status information that were eliminated by the eliminating unit.

According to the configuration of (10), when the status information of the image forming device are received a plurality of times, the wasteful communication of the second time onward can be eliminated.

(11) In the status information management system of (9), there may be configured that the device identification information, included in the status information that the management device receives from the information processing terminals, includes a model code that indicates a type of the image forming apparatus, and a serial number unique to the image forming apparatus.

According to the configuration of (11), since the information processing terminal sends the model code and the serial number to the management device, the image forming apparatuses can be identified more precisely at the management device.

(12) In the status information management system of (9), the status information that the management device receives from the information processing terminals may be configured to include a maintenance information that indicates information on deterioration of components of the image forming apparatus, and the maintenance information maybe configured to include at least one of an information on remaining amounts of ink or toner for forming the image on the recording medium, and a page counter information that indicates a number of recording medium on which image forming is performed by the image forming unit.

According to the configuration of (12), since the management device can receive the maintenance information via the information processing terminals, the timing of exchange of a component, etc., can be ascertained at the information processing terminals.

The foregoing description of the illustrative aspect has been presented for purposes of illustration and description. It is not intended to be exhaustive or to limit the invention to the precise form disclosed, and modifications and variations are possible in light of the above teachings or may be acquired from practice of the invention. The illustrative aspect was chosen and described in order to explain the principles of the invention and its practical application program to enable one skilled in the art to utilize the invention in various illustrative aspects and with various modifications as are suited to the particular use contemplated. It is intended that the scope of the invention be defined by the claims appended hereto, and their equivalents.

What is claimed is:

1. An image forming apparatus comprising:
    a first tangible communication port which performs data communication with an information processing terminal;
    a second tangible communication port which performs data communication with a second information processing terminal when the second information processing terminal is communicably connected to the second communication port;
    an image forming unit that forms an image on a recording medium;
    a determining unit that
        determines, when an inquiry of a device state is received from a first information processing terminal connected to the first tangible communication port, whether the second tangible communication port is communicably connected with the second information processing terminal, and
        determines, when it is determined that the second tangible communication port is communicably connected with the second information processing terminal, whether, among the communication ports connected to information processing terminals, the first tangible communication port has a highest priority according to a priority order set in advance for the communication ports; and
    a status information sending controlling unit that
        sends status information indicating an operating state of the image forming apparatus through the first tangible communication port to the first information processing terminal, when the determining unit determines that the second tangible communication port is not communicably connected with the second information processing terminal or that the second tangible communication port is communicably connected with the second information processing terminal and the first tangible communication port has the highest priority, and that
        does not send the status information through the first tangible communication port to the first information processing terminal, when the determining unit determines that the second tangible communication port is communicably connected with the second information terminal and the first tangible communication port does not have the highest priority.

2. The image forming apparatus according to claim 1, wherein the status information sending controlling unit sends the status information including device identification information for identifying the image forming apparatus, and maintenance information indicating deterioration of components of the image forming apparatus.

3. The image forming apparatus according to claim 2, wherein the status information sending controlling unit sends the device identification information including a model code for identifying a type of the image forming apparatus, and a serial number unique to the image forming apparatus.

4. The image forming apparatus according to claim 2, wherein the status information sending controlling unit sends the maintenance information including at least one of information on remaining amount of ink or toner for forming the image, and page counter information that indicates a number of recording medium on which image forming is performed by the image forming unit.

5. The image forming apparatus according to claim 1, wherein the communication ports includes a parallel port that transmits data by a parallel transmission method, and a USB port that transmits data by a USB specified transmission method, and
    wherein the parallel port is configured to have the higher priority than the USB port.

6. The image forming apparatus according to claim 1, wherein the determining unit comprises:
    an inquiry determining unit that determines whether the inquiry of the device state is received from the first information processing terminal;
    a second tangible communication port presence determining unit that determines whether the second tangible communication port is present when the inquiry determining unit determines that the inquiry is received; and
    a priority determining unit that determines, when the second tangible communication port presence determining unit determines that the second tangible communication port is present, whether, among the communication ports connected to the information processing terminals, the first tangible communication port has the highest priority according to the priority order set in advance for the communication ports.

7. A management information processing terminal comprising:
    a first communication unit that performs communication with an the image forming apparatus that includes a plurality of tangible communication ports, each of which performs data communication with an information processing terminal, the image forming apparatus performing a process of forming an image on a recording medium, and performing, upon receiving an inquiry of a device state from an information processing terminal, a process of sending a port information indicating types of the communication ports connected to currently operating devices, and a status information indicating the state of the image forming apparatus, to the information processing terminal that made the inquiry of the device state;
    a second communication unit that is connected to a network to perform communication with a management apparatus that manages the operation state of the image forming apparatus through the network;
    an acquisition unit that inquires through the first communication unit to the image forming apparatus of the device state of the image forming apparatus, and acquires the port information and the status information from the image forming apparatus in response to the inquiry;

a determining unit that determines, based on the port information acquired by the acquisition unit, whether a second tangible communication port of the image forming apparatus is communicably connected to another information processing terminal, and when the second tangible communication port is communicably connected to the another information processing terminal, determines whether, among the communication ports connected communicably to the information processing terminals, a first tangible communication port connected to the management information processing terminal has a highest priority according to a priority order set in advance for the respective communication ports; and a sending unit that sends through the second communication unit the status information acquired by the acquisition unit to the management device when the determining unit determines that the second tangible communication port is not communicably connected to the another information processing terminal or determines that the first tangible communication port is the communication port having the highest priority.

8. A computer-readable program product causing a computer to execute the procedures for managing status information, wherein the computer comprises:

a first communication unit that performs communication with an the image forming apparatus that includes a plurality of communication ports, each of which performs data communication with an information processing terminal, the image forming apparatus performing a process of forming an image on a recording medium, and performing, upon receiving an inquiry of a device state from an information processing terminal, a process of sending a port information indicating types of the communication ports connected to currently operating devices, and a status information indicating the state of the image forming apparatus, to the information processing terminal that made the inquiry of the device state; and a second communication unit that is connected to a network to perform communication with a management apparatus that manages the operation state of the image forming apparatus through the network, wherein the program product causing the computer to execute the procedures comprising:

inquiring through the first communication unit to the image forming apparatus of the device state of the image forming apparatus;

acquiring the port information and the status information from the image forming apparatus in response to the inquiry;

determining, based on the port information acquired by the acquisition unit, whether a second communication port that is communicably connected to another information processing terminal is present in the image forming apparatus;

determining, when the second communication port is communicably connected with the another information processing terminal, whether, among the communication ports connected communicably to the information processing terminals, a first communication port communicably connected to the management information processing terminal has a highest priority according to a priority order set in advance for the respective communication ports; and sending through the second communication unit the status information acquired by the acquisition unit to the management device when it is determined that the second communication port is not communicably connected to one of the information processing terminals or that the first communication port is the communication port having the highest priority.

9. A status information management system comprising:

an image forming apparatus that includes a plurality of tangible communication ports, each of which performs data communication with an information processing terminal, the image forming apparatus performing a process of forming an image on a recording medium, and performing, upon receiving an inquiry of a device state from an information processing terminal, a process of sending a port information indicating types of the communication ports connected to currently operating devices, and a status information indicating the state of the image forming apparatus, to the information processing terminal that made the inquiry of the device state;

a management device that manages the operation state of the image forming apparatus; and a plurality of information processing terminals, each of the information processing terminals being enabled to communicate with the management device through a network, being respectively connected to the communication ports of the image forming apparatus, and being configured to: inquire, upon receiving from the management device an instruction of requesting status information, the device state to the image forming apparatus; send, upon receiving the status information in response to the inquiry of the device state, a new status information, with which a device identification information for specifying the connected image forming apparatus is added to the received status information, to the management device, wherein the management device comprises:

a communication unit that performs communication with the information processing terminals that are communicably connected through the network;

an acquisition unit that sends through the communication unit to the information processing terminals connected to the management device, an instruction to request the status information from the image forming apparatus connected to the information processing terminals, and acquires the status information in response to the instruction through the communication unit; and an eliminating unit that determines, based on the device identification information included in the status information acquired by the acquisition unit, whether the acquired status information includes status information that is sent from the same image forming apparatus, and eliminates the status information with the exception of one of the status information when there is status information that is sent from the same image forming apparatus.

10. The status information management system according to claim 9, wherein the management device further comprises a prohibiting unit that prohibits the acquiring unit from sending the instruction to the information processing terminals that sent the status information that were eliminated by the eliminating unit.

11. The status information management system according to claim 9, wherein the device identification information, included in the status information that the management device receives from the information processing terminals, includes a model code that indicates a type of the image forming apparatus, and a serial number unique to the image forming apparatus.

12. The status information management system according to claim 9, wherein the status information that the management device receives from the information processing terminals includes a maintenance information that indicates information on deterioration of components of the image forming apparatus, and wherein the maintenance information includes at least one of an information on remaining amounts of ink or toner for forming the image on the recording medium, and a page counter information that indicates a number of recording medium on which image forming is performed by the image forming apparatus.

13. An image forming apparatus comprising:

a plurality of tangible communication ports, each of which performs data communication with at least one of a plurality of information processing terminals when the respective port is communicably connected to one of the plurality of information processing terminals;

an image forming unit that forms an image on a recording medium;

a determining unit that determines, when an inquiry of a device state is received from a first information processing terminal connected to a first tangible communication port, whether a second tangible communication port is communicably connected to a second information processing terminal, and determines, when it is determined that the second tangible communication port is communicably connected with the second information processing terminal, whether, among the communication ports connected to information processing terminals, the first tangible communication port has a highest priority according to a priority order set in advance for the communication ports; and a status information sending controlling unit that sends status information indicating an operating state of the image forming apparatus through the first tangible communication port to the first information processing terminal, based on whether the second tangible communication port is communicably connected with the second information processing terminal and whether the first tangible communication port has the highest priority, and that does not send the status information through the first tangible communication port to the first information processing terminal when the determining unit determines that the second tangible communication port is communicably connected with the second information terminal and the first tangible communication port does not have the highest priority.

* * * * *